United States Patent Office 3,669,603
Patented June 13, 1972

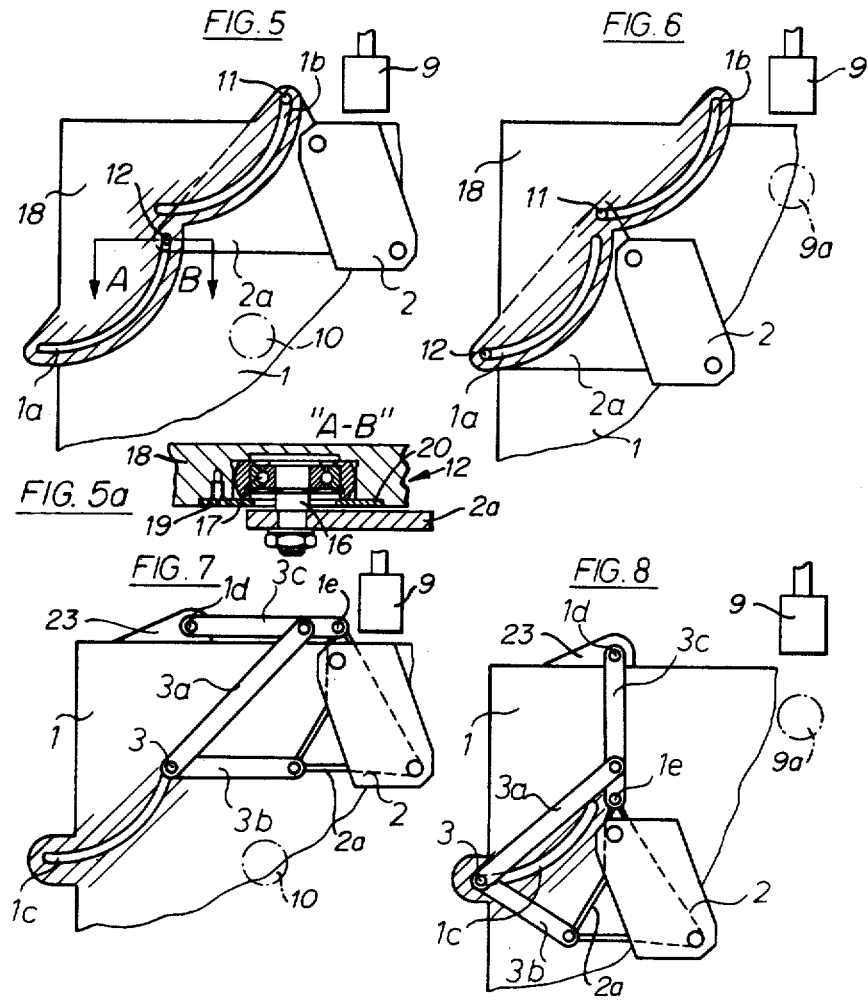

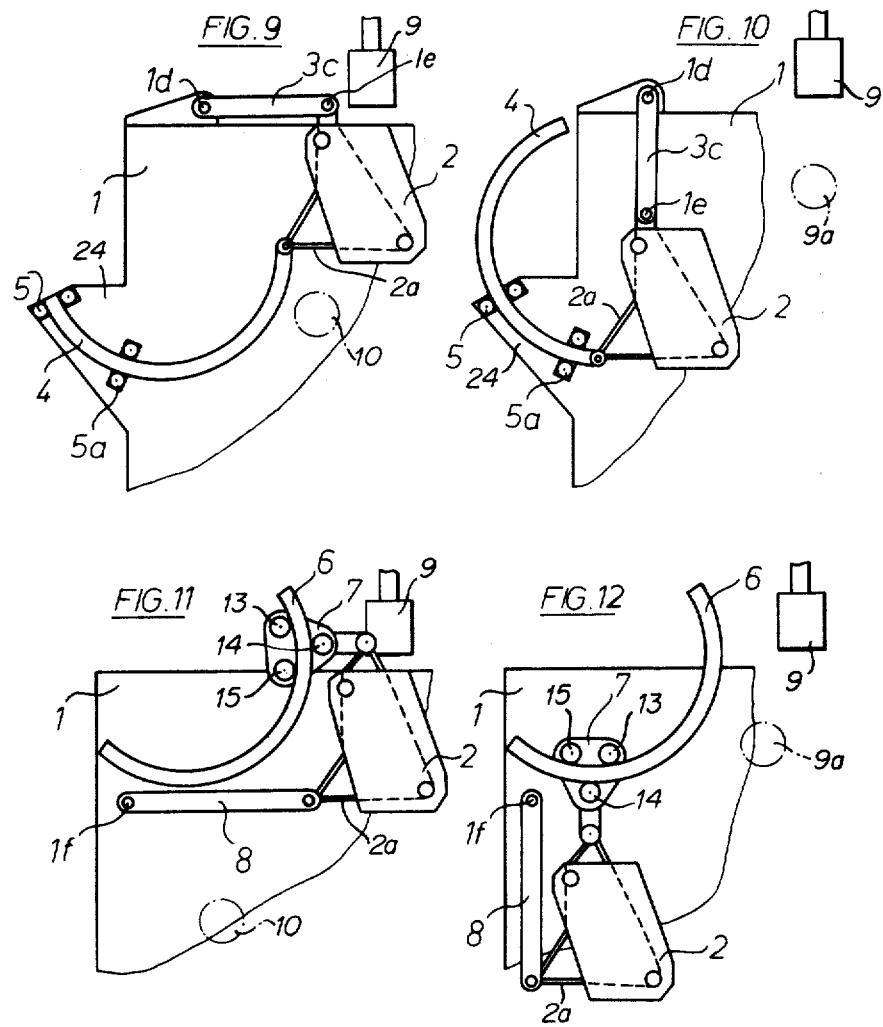

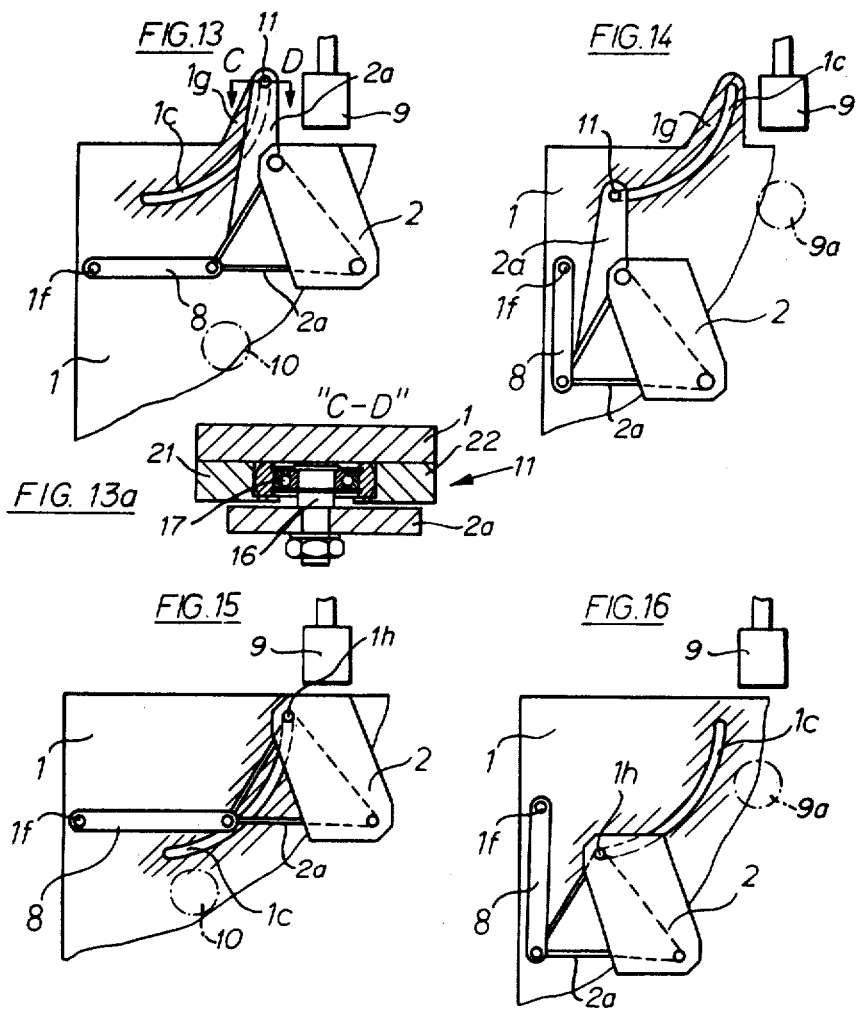

3,669,603
DEVICE FOR PRODUCING HOLLOW ARTICLES FROM THERMOPLASTIC SYNTHETIC MATERIAL
Wilhelm Keller, Karlsruhe-Bergwaldsiedlung, and Peter Kallenowski and Peter Schmidt, Ettlingen, Germany, assignors to said Wilhelm Keller and said Peter Kallenowski
Filed Apr. 30, 1970, Ser. No. 33,391
Claims priority, application Germany, Apr. 30, 1969,
P 19 22 090.7
Int. Cl. B29d 23/03
U.S. Cl. 425—326                              4 Claims

ABSTRACT OF THE DISCLOSURE

A device for producing hollow articles such as bottles, cans and the like made of thermoplastic material by the blowing process is provided with a mold which is moved from the spray nozzle at a receiving station to an article discharge station. The mold is connected at two spaced points with levers the far ends of which are operatively connected with cam grooves or with cam tracks on the machine frame so that the mold is initially moved substantially vertically away from the spray nozzle and then laterally or inclined toward one side toward the article discharge station.

---

The invention relates to a device for the production of hollow articles, particularly bottles, cams or the like, made of thermoplastic synthetic material by the blowing process, comprising a two- or multi-part hollow mold, which is moved to and fro between the spray-nozzle of an extruder at the receiving station and another station at which the hollow article is removed from the mold, namely, the mold-opening station, whereby the blower mold itself or the holding plates carrying the blower mold, or framework are carried by levers, oscillating members, projections or arms, which on the one hand—may be offset diagonally if desired—are pivoted to the blower mold (holding plates), and on the other hand to the machine-frame.

For the production of hollow articles, for example, bottles, cans or boxes or the like from thermoplastic synthetic material, according to the blowing process, it is customary to move the two- or multi-part blower mold to and fro between two end positions. Such a moving operation takes place in known devices as a rule between the spray-nozzle of an extruder (receiving station) and a station in which the hollow body is removed from the mold (mold-opening station). The blower mold is in many cases secured to special holding plates or the like, which, if other blower parts are to be produced, permits an easy and convenient exchange of the mold against another.

It is believed to be obvious that the machine parts producing the to and fro movement of the blower mold or the holding plates, respectively, must be given particularly constructive attention, as on account of their multiplicity of to and fro movements per unit of time, they are subjected to high mechanical stresses and as a result thereof are also subjected to not inconsiderable wear.

It is furthermore obvious that members producing the to and fro movement of the blower mold or the holding plates, respectively, as a result must be of relatively high durability, if for longer time a precise course of movement as well as just as precise an end position in both positions has to be asurred—which in particular extent applies also to the end position of the spray-nozzle of the extruder. Of importance is in this connection finally also that the movable members must have accurate guides which insure an accurate operation of the device and accordingly produce finished products exact as to size.

The previously known devices of this type were capable of meeting the requirements put in this respect only to a certain degree.

Thus already a device was suggested for the production of blower bodies from thermoplastic synthetic material according to the blower method, in which the holding plates carrying the hollow body are carried by links which in the direction of movement of the mold are hingedly connected consecutively with the holding plates and are hinged with their upper ends above the holding plates on the machine frame.

Although with this known device, particularly with the method of one operative position into the other, the forces occurring are imparted in the ideal case relatively uniformly to the two guide-rods arranged consecutively with spacing in direction of movement, both the hinge points on the blower mold or on the holding plates, respectively, as well as those disposed on the machine frame are then subjected above all to high wear, if the blower mold has a large radial range and in view of its specific gravity the forces occurring engage on the one side and the mold inclines upon acceleration into the receiving station to tipping over.

Such unfavorable pivoted loads could be prevented, at least however, decreased, if correspondingly dimensioned or constructed respectively guide- and/or supporting-means were provided—which, however, are not used in the known device, quite apart therefrom, that this known link-arrangement apparently serves solely as a conveyance of the tube from the nozzle to the mold-opening station, which there simultaneously forms a blowing station.

Furthermore, it was already suggested that a horizontally extruded tube be inflated directly behind the nozzle within blower molds engaging on top of one another hand over hand, whereby the molds likewise are moved horizontally in the plane of the axis of the tube somewhat at extrusion speed away from the nozzle.

With this known method the ideal condition required is indeed theoretically attained in practice, however, the tube sags between its front and rear supporting points on account of its specific gravity, obviously most strongly when the molds are very long or also with greater tube weight, respectively. In this case, it amounts to different wall thicknesses.

In another known device for the production of hollow bodies from the thermoplastic synthetic material, it was possible by an arrangement of diagonally offset swinging members hinged to the holding- or tension-plates to overcome the forces acting on the one side on the hinge-points to a certain degree, however, here also on account of lack of suitable guide- and/or supporting-means, unfavorable link loads and bearing wear could not be fully avoided.

In most of the blower methods in use today, the tube is first blown up at the mold-opening station. In this method the path from the nozzle to the beginning of the blowing requires approximately 1 second. As the total time of an operating cycle—from the removal of the tube to the opening of the mold of the finished hollow body amounts only to approximately 5–10 seconds, there remains thus about 10–20% of this total time unused.

Beyond this, during the time of conveying the unblown tube, which then is clamped between the cooled rims of the mold, between the nozzle and the mold opening station and indeed until the blowing is started and the blowing operation is set in motion, heat is drawn from the tube walls near the clamping points—which may lead to undesired tube expansions upon blowing. Furthermore, the danger exists that the tube may collapse along the conveyance path.

In view of the foregoing, an object of the present invention is a device in which the arms of the blower mold or the holding- or tension-plates are arranged that they are practically free from wear and also are supported or guided by special means.

The object of the invention is attained essentially in this manner, that at least one of the arm-like connection members serving for the mounting of the blower mold is provided with means which insure its guidance, support, and securing in at least one correspondingly constructed cam groove or groove guide-rail—if necessary over auxiliary- or intermediary-members—in or on the machine frame of the receiving station in the mold-opening station (and vice versa), whereby the direction of movement of the mold from the nozzle lies in its first portion of the path within the nozzle axis, at least, however, when the path is arcuate by use of a lever, in the direction of the sector tangent in the stage of the blowing up of the tube-mold-piece so as to coincide somewhat with the tube-extrusion axis.

In a preferred embodiment, in accordance with the invention, arm-like connection members are combined to a somewhat triangular-shaped plate and are provided with rollers or the like, which engage preferably in corresponding recesses constructed as curved cam grooves.

In a further development of this embodiment, the invention suggests that on the free ends of each of the two projections are arranged arms, bolts, pins or the like, which serve for the reception of anti-friction bearings engaging the curved tracks of the recess.

In accordance with two other features of the invention, it is possible that the recesses for the two curved tracks are arranged both in the machine frame itself as well as also in a plate fixed on the machine frame.

Further features of the invention in the preferred form of embodiment therein, provide that the recesses of the two curved tracks are provided with means which insure an axial security of the anti-friction bearings engaging the curved track. These security means consist, according to the invention, essentially of the flat strips which conform to the shape of the curved track and extending slightly beyond the width of the recesses.

Obviously, the invention is in no manner exhausted alone by the preferred embodiment, which was discussed in the foregoing. The inventive idea permits just as well of being set forth concretely by means of a recess constructed as guide- and control curve in or on the machine frame for the cooperation with an arm arranged on the blower mold (holding plates), which together with a second arm arranged on the blower mold (holding plates) and a link connecting both arms forms a quadrilateral link whereby the second arm may have its point or rotation and supporting point disposed outside of the machine frame.

The point of rotation and support for the second arm of the quadrilateral link in accordance with a further feature of the invention, is formed by a boss or the like arranged on the machine frame; the first arm is according to another feature of the invention guided at its connection point with the link in the control curve.

In addition to the manner of construction discussed above, the invention may also be practiced by two arms hingedly connected with the blower-mold-mounting, one of which has circular-section-shaped form, whose guide means may be arranged likewise outside of the machine frame, as well as the point of rotation and bearing point of the second extended arm which is connected with the blower-mold-mounting.

In further development of this suggestion, the guide means for the ring-shaped arm may be arranged on a bracket or the like releasably connected with machine frame. This suggestion may still be supplemented in this manner, that the guide means consists essentially of one or more U-shaped formed bridges or the like, whose inner dimensions correspond with those of the ring-shaped arm.

A further embodiment of the invention is characterized by an extended arm hingedly connected on the one hand with the blower-mold mounting and on the other hand with the machine frame, and a control curve of circular-sectional shape connected with the machine frame, in which an auxiliary- or intermediary-member or a holding-plate arm, respectively hingedly connected with the blower-mold mounting is guided.

Of especial advantage has been found a further feature of the invention in accordance with this embodiment, in that the auxiliary- or intermediary-member is constructed according to the type of a traveling crab of a lifting-apparatus. This variation of the embodiment finds its further development in this, that the circular-sectional-shaped control curve is fixed supportingly with its end projecting beyond the machine frame on a bracket, flange or the like.

Another embodiment of the invention is finally characterized by an extended arm hingedly connected with the blower-mold-mounting, on the one hand, and on the other hand with the machine frame, and guided by a bushing, roller or the like in a ring-shaped sector-like control curve, said bushing being mounted on an axis attached to the blower mold support. With the recommended invention, are obtained quite a few advantages:

The device from a structural-constructive point of view is very simple, inexpensive and therefore relatively inexpensive.

For insuring the operation of the device, namely, a faultless execution of the blowing procedure directly below the extruder nozzle, it is assured that the movable members which carry the mold-holding plates are moved on optimally shaped tracks, whereby a disadvantageous lateral swinging out of the tube made of synthetic material within the blower mold during the blowing operation with its undesired consequences, such as unequal wall thickness and high quota of rejects among the cooled finished parts is safely prevented.

These greatly undesired unequal wall thicknesses of blown bodies made of synthetic material, which result from non-centered position of the hot tube or even from a slight deviation of a tube section from the longitudinal axis of the mold during the blowing operation, are as known caused by the fact that the outer side of the tube which through its closer position to the cooled inner wall of the mold during the blowing operation first comes to deposit on the wall, is also cooled first and thereby in the course of the further blowing due to commencing solidification, is expanded less, and accordingly remains thicker-walled than those tube sections which still have their extrusion temperature and come last in point of time to the wall deposit and cooling. The last named points of the blown hollow bodies of these known devices then have such undesired thin walls that the containers become rejects.

The blowing operation continuing for a fraction of a second, in accordance with the device according to the invention, to the contrary, is preferably started immediately with the surrounding of a section of the tube extruded vertically downwardly from the nozzle within the mold halves in their uppermost position under the nozzle. At the same time, the tube is cut-off above the holding plates. The mold travels upon blowing up at least with the tube extrusion speed in the direction of the axis of the tube downwardly and after blowing, up to the mold opening station at the side.

This course of operation makes it possible to utilize almost the entire time in which the molds move along their path from the receiving station to the mold opening station for cooling the blown hollow bodies, whereby an effective saving of time of approximately 10 . . . 20%, referred to the entire operating cycle amounting to about 5 ... 10 sec., is attained.

A particular advantage of the invention is also that in view of the extraordinarily correctly formed curved tracks also a very accurate guidance of the rolls or antifriction bearings respectively, is assured in these curved tracks, so that again a reliable operation of the molds from one end position to the other is attained and an oscillation or swinging of the molds during the method from the one end position to the other is prevented.

The drawing illustrates diagrammatically several examples of the device of the invention.

In the drawings:

FIG. 5 shows a device similar to that of FIGS. 1 and 3, however, with parallel extending arcuate cam tracks, whereby the mold or its holding plates, respectively, is or are disposed in the upper end position (blowing position).

FIG. 5a is a sectional view of the FIG. 5 along the line A-B and illustrates an anti-friction bearing in the cam track attached by a bolt to a holding plate and provided with profiled strips 19, 20 forming abutments for the anti-friction bearing.

FIG. 6 shows the device according to FIG. 5 with mold or holding plates, respectively disposed in the lower end position (mold-opening position).

FIG. 7 shows another device, in which the suspension of the mold or its holding plates, respectively, takes place, on the one hand, by means of a guide-rod and on the other hand by means of a steering suspension whose connection point is guided in an arcuate cam track, whereby the mold (holding plates) is or are disposed in the upper end position (blowing position).

FIG. 8 shows the device according to FIG. 7 with mold (holding plates) disposed in the lower end position (mold opening position).

FIG. 9 shows another device, in which the suspension of the mold (holding plates) takes place, on the one hand, by means of a guide-rod and on the other hand, by means of a ring-shaped section connected with the mold, which is guided by pairs of rollers attached to the machine-frame, whereby the mold (holding plates) is disposed in the upper end position (blowing position).

FIG. 10 shows the device according to FIG. 9 with mold (holding plates) disposed in the lower end position (mold opening position).

Figure 1:
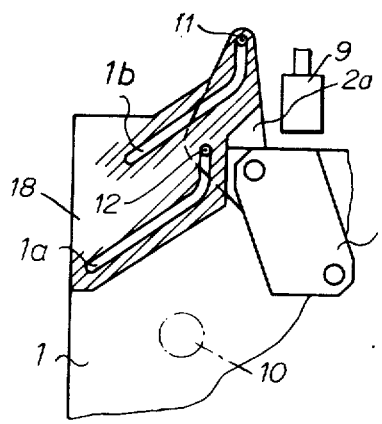
FIG. 1 shows the device according to the invention with initially vertical parallel cam tracks and then extending inclined toward one side, whereby the mold or its holding plates, respectively, are disposed in the upper end position (blowing position).

FIG. 11 shows a device in which the suspension of the mold (holding plates) takes place, on the one hand, by an intermediary connection of an auxiliary member of the type of a traveling crab of a hoisting appliance and co-operating with a ring-shaped section attached to the machine, and on the other hand, by means of a guide-rod, whereby the mold (holding plates) is disposed in the upper end position (blowing position).

FIG. 12 shows the device according to FIG. 11 with mold (holding plates) disposed in the lower end position (mold opening position).

FIG. 13 shows a device in which the suspension of the mold (holding plates) on the one hand, takes place by means of an arm guided in a curved track provided in the machine framework and on the other hand by means of a rotationally movably guide-rod pivotally attached to the machine-frame, whereby the mold (holding plates) is disposed in the upper end position (blowing position).

FIG. 13a is a sectional view of the cam track along the line C-D of FIG. 13, including profiled strips 21, 22 which constitute axial abutments for the anti-friction bearing.

FIG. 14 shows the device according to FIG. 13, with mold (holding plates) disposed in the lower end position (mold opening station).

FIG. 15 shows a particularly low-constructed device in which the mold (holding plates) on the one hand are guided in a cam track provided in the machine framework and on the other hand, by means of a guide-rod pivotally attached to the machine frame so as to be rotationally movable, whereby the mold (holding plates) is or are disposed in the upper end position, and finally.

FIG. 16 shows the device according to FIG. 15 with the mold (holding plates) disposed in the lower end position (mold opening station).

Referring to the FIGS. 1 to 16, the machine frame, in each case is designated with the reference character 1 and the mold (holding plates) with the reference character 2.

The triangular arm 2a, in the FIGS. 1 to 6 is fixedly connected with the mold 2 and is provided with rollers, anti-friction bearings 17 and pivot means 16 therefor which are guided in cam tracks 1a and 1b extending parallel to one another. The cam tracks form longitudinal recesses arranged in a plate 18 attached to the machine frame 1. The blower mold 2 is carried on the arm 2a by pivoted members 11, 12 (FIGS. 1 to 4) or 13, 14 and 15 (FIGS. 11 and 12).

Figure 2:
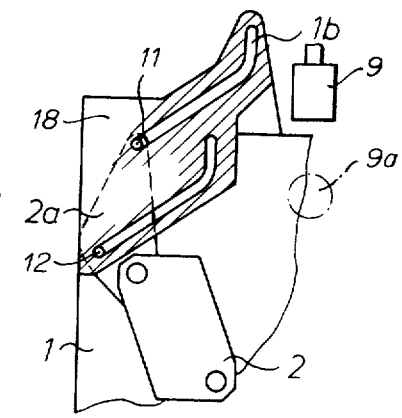
FIG. 2 shows the device according to FIG. 1 with the mold or holding plates, respectively disposed in the lower end position (mold opening position).
Figure 3:
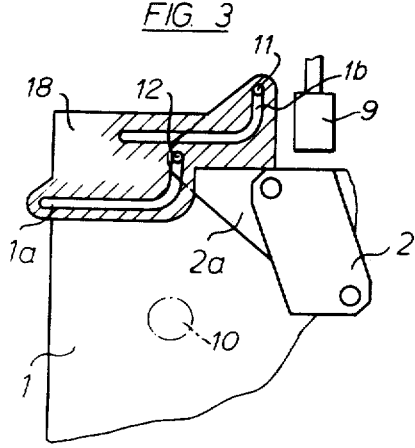
FIG. 3 shows a device similar to that of FIG. 1, however, with initially vertical and then horizontally extending parallel cam tracks, whereby the mold or its holding plates, respectively are disposed in the upper end position (blower position).
Figure 4:
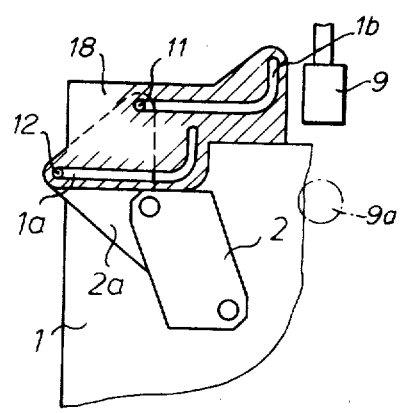
FIG. 4 shows the device according to FIG. 3, with mold or holding plates, respectively disposed in the lower end position (mold opening position).

The cam tracks 1a, 1b according to FIGS. 1 to 6, depending upon the particular requirement, may have different shapes. They may extend initially vertically downward and then inclined toward one side (FIGS. 1 and 2). Another cam track arrangement provides that the cam tracks 1a, 1b initially extend vertically downward and then horizontally toward one side (FIGS. 3 and 4). A further arrangement provides that the cam tracks 1a, 1b are arranged in the machine frame 1 according to the type of arcuate cam tracks as illustrated in the FIGS. 5 and 6.

In the illustrated embodiments the came tracks 1a and 1b are provided in the machine frame 1, substantially parallel to one another and are adapted to guide the mold 2 from an upper receiving station 9a directly below the spray nozzle 9 of an extruder to a lower end or mold opening station 10.

In the embodiment according to FIGS. 7 and 8, an arcuate cam track 1c is arranged in the machine frame 1, in which is guided a not illustrated roller or anti-friction bearing 17 or the like. The roller is attached at the connection point 3 of the linkage consisting of the arms 3a and 3b; the arm 3a is also connected with the lever 3c, whose one end is rotationally movable at the point 1d of an arm 23, while its other end 1e is pivotally connected with the mold 2 or with the holding plate 2a, respectively.

In FIGS. 9 and 10, the circular ring section 4 is pivotally connected at one of its ends with the lower end of the mold 2 (holding plate 2a), and is guided between the two pairs of rollers 5 and 5a arranged on a bracket 24 forming a part of the frame 1; the upper end of the mold 2 (holding plate 2a) is pivotally connected at 1e with the lever 3c and at 1d with the machine frame 1. The rollers 5 and 5a may comprise a U-shaped bridge whose inner dimensions correspond with those of the circular ring section 4.

In contrast to the embodiment illustrated in the FIGS. 9 and 10, the embodiment illustrated in the FIGS. 11 and 12 employs a circular ring section 6 which is fixedly attached to the machine frame 1. The mold 2 (holding plate 2a) by means of an auxiliary member constructed as a traveling crab 7 of a hoisting device and pivotally attached thereto is operatively connected with said circular ring section 6 in such manner, that the auxiliary member during the movement of the mold 2 (holding plate 2a) travels from one end position to the other end position along the stationary circular ring section 6. The other side of the mold 2 (holding plate 2a), however, by means of the lever 8 is pivotally connected with the machine frame 1; whereby the pivot point 1f lies within the machine frame 1.

In the embodiment of the invention according to FIGS. 13, 14 a cam track 1c is arranged in the machine frame 1, and continues into a projection 1g which is integrally formed with machine frame 1 and projects upwardly therefrom. This cam track 1c guides a roller anti-friction bearing 17 or the like which is attached to the arm 2a of the mold 2 (holding plate 2a). The other side of the mold 2 (holding plate 2a) is pivotally connected to one end of the lever 8, the other end of which is pivotally connected with the machine frame 1; the pivot point 1f lies here also within the machine frame 1. Obviously, for a reliable guidance of the mold 2 (holding plates 2a) both sides of the machine frame 1 may be provided with a cam track 1c, an arm 2a and a projection 1g.

The FIGS. 15, 16 finally show a particularly low-constructed embodiment of the device according to the invention, in which both the cam track 1c as well as the lever 8 is disposed within the machine frame 1.

It is obvious that additional embodiments may be employed by a variation or combination of the lever- and cam track- or arrangement of the same, without changing the basic invention which therefore is not limited to the embodiments illustrated and described.

What we claim is:

1. In a device for producing hollow articles, particularly bottles, cans and the like, from thermoplastic synthetic material by the blowing process, a machine frame, a spray nozzle, a blow mold, means for guiding said blow mold to and fro between said spray nozzle at a receiving station and means forming a mold opening station at which the blow molded hollow article is removed, said means for guiding said blow mold including arm means carrying said blow mold and pin means attached to said arm means and also to said machine frame, respectively, wherein the improvement comprises cam track means on said machine frame for guiding said blow mold, and that said pin means on said arm means carries anti-friction means which assure the guidance of said arm means along said cam track means, said cam track means extending from said receiving station to said mold opening station, whereby the direction of movement of the mold away from said receiving station during its initial movement is substantially vertical in a vertical plane, namely in the direction of the axis of said spray nozzle during the blowing operation, whereupon the movement changes within the same plane to an inclined path by employing an inclined portion of said cam track means, wherein said arm means has the shape of a substantially triangularly-shaped plate having mounted thereon roller means which engage cam grooves having the form of longitudinal recesses for guiding and controlling the movement of said mold.

2. Device according to claim 1, in which said pin means on said arm means serve for the reception and retention of roller means engaging said cam tracks.

3. Device according to claim 1, in which said cam track means comprise cam grooves provided with means which provide an axial abutment means for roller means engaging said cam grooves.

4. Device according to claim 3, in which said abutment means consist of profiled strips confroming to the shape of the cam grooves and extending slightly beyond the width of said recesses.

References Cited
UNITED STATES PATENTS

| | | | |
|---|---|---|---|
| 3,235,907 | 2/1966 | Harwood et al. | 18—5 BB |
| 3,243,847 | 4/1966 | Gogelberg et al. | 18—5 BT |
| 3,516,118 | 6/1970 | Gallay | 18—30 JA UX |
| 3,496,600 | 2/1970 | Heston | 18—5 BB |

FOREIGN PATENTS

| | | | |
|---|---|---|---|
| 1,498,659 | 1967 | France | 18—5 BP |

H. A. KILBY, Jr., Primary Examiner

U.S. Cl. X.R.

425—453, 450